US011966713B1

(12) United States Patent
Allocco et al.

(10) Patent No.: US 11,966,713 B1
(45) Date of Patent: Apr. 23, 2024

(54) COMPUTER-BASED TOOLS FOR IDENTIFYING AND CONNECTING WITH HUMAN LANGUAGE TRANSLATORS

(71) Applicant: Zoose Language Technologies LLC, Denville, NJ (US)

(72) Inventors: Patrick S. Allocco, Denville, NJ (US); Shalini Kadavill, Kerala (IN)

(73) Assignee: Zoose Language Technologies LLC, Denville, NJ (US)

( * ) Notice: Subject to any disclaimer, the term of this patent is extended or adjusted under 35 U.S.C. 154(b) by 295 days.

(21) Appl. No.: 17/477,449

(22) Filed: Sep. 16, 2021

Related U.S. Application Data

(60) Provisional application No. 63/079,014, filed on Sep. 16, 2020.

(51) Int. Cl.
*G06F 40/58* (2020.01)
(52) U.S. Cl.
CPC .................... *G06F 40/58* (2020.01)
(58) Field of Classification Search
USPC ..................................................... 704/1–504
See application file for complete search history.

(56) References Cited

U.S. PATENT DOCUMENTS

| 10,402,501 | B2* | 9/2019 | Wang | G10L 15/22 |
| 10,977,452 | B2* | 4/2021 | Wang | G10L 15/1822 |
| 11,080,336 | B2* | 8/2021 | Van Dusen | G06N 5/02 |
| 2017/0235848 | A1* | 8/2017 | Van Dusen | G06Q 30/0201 705/12 |
| 2018/0052842 | A1* | 2/2018 | Hewavitharana | G06F 16/24522 |
| 2018/0052913 | A1* | 2/2018 | Gaskill | G06N 5/02 |
| 2018/0314689 | A1* | 11/2018 | Wang | G10L 15/1822 |
| 2019/0332680 | A1* | 10/2019 | Wang | G10L 15/07 |
| 2023/0289340 | A1* | 9/2023 | Cella | G06F 16/24537 707/714 |

\* cited by examiner

*Primary Examiner* — Marcus T Riley
(74) *Attorney, Agent, or Firm* — Michael D. Lazzara; Leech Tishman Fuscaldo & Lampl LLC

(57) ABSTRACT

In various embodiments, a computer-implemented language identification and communication system is provided. The system includes an application engine configured for processing data associated with multiple access devices of a population of users who are users seeking human language translation services and users providing human language translation services. A geolocation module is provided for locating a position of various users, such as the different locations of human language translators. The application engine is further programmed for receiving translator selections from user access devices and establishing communication connections between or among different user access devices.

18 Claims, 6 Drawing Sheets

All Plans

| Standard | Premium |
|---|---|
| $14.99 | $15.99 |
| 11 Minutes of Talktime | 15 Minutes of Talktime |

72.5 Minutes
Current Balance

Standard
$14.99

11 Minutes of
Talktime

CONTINUE TO PURCHASE PLAN

FIG. 4

SOLUTIONS TO THE PICTURE PROBLEMS

1. The box is black.
2. John is standing.
3. This is a pencil.
4. There is no box here.
5. This is a table.
6. The box is on the table.
7. This is a house.

HOW TO USE THE BOOK

If speaking is the goal, then learn to answer the Picture Problems with the key-sentences (see next page, Unit 1). If the language is not English, then the translation in the language of your choice should be provided.

Learn to respond to the Pictures with confidence and without mistakes.

If the goal is spelling, then learn to spell the capitalized words.

Looking at the Pictures only and never at the printed words you should spell the words like this:

The box is big, b-i-g.

The box is small, s-m-a-l-l.

The box is white, w-h-i-t-e, etc.

When you can do Unit 1 correctly and quickly, go on to the next Unit.

IMPORTANT: Before you start the next unit go over everything you have already learned.

FIG. 5

UNIT 2
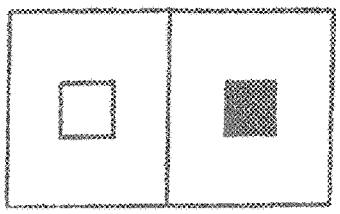 1. The box is BLACK.
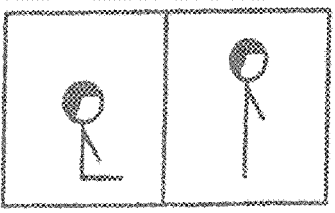 2. John is STANDING.
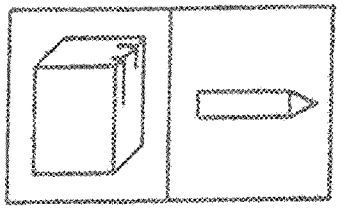 3. This is a PENCIL.
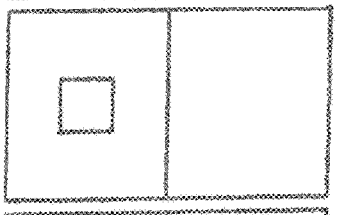 4. There is NO box here.
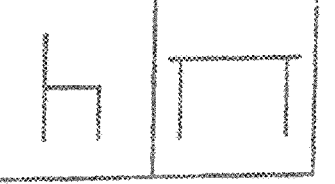 5. This is a TABLE.
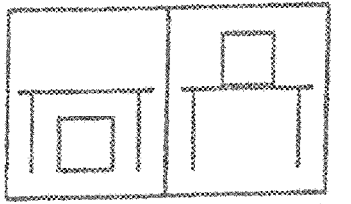 6. The box is ON the table.
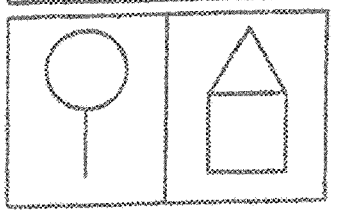 7. This is a HOUSE.
FIG. 6

COMPUTER-BASED TOOLS FOR IDENTIFYING AND CONNECTING WITH HUMAN LANGUAGE TRANSLATORS

CROSS REFERENCE TO RELATED APPLICATION/PRIORITY CLAIM

The present application is a non-provisional patent application which claims priority to U.S. Provisional Patent Application Ser. No. 63/079,014, filed on Sep. 16, 2020, the entirety of which is incorporated by reference herein.

FIELD OF THE INVENTION

In various embodiments, the present invention generally relates to computer-based tools, devices, and processes for identifying connecting human language translators with users in need of translation services.

BACKGROUND

Reliable translation is a critical need for communications between and among people who use different human languages. A traffic stop, a car accident, a medical emergency, getting directions, a banking issue, a taxi ride, and a lost passport or visa are among many of the daily activities and events which involve understanding human language. They can become overwhelmingly negative and frightening experiences for travelers visiting a foreign city or country with little or no knowledge of the local language. At present, many travelers venture forth with only hope and blind faith that someone—who is as yet unknown to them—will be able to assist in translating the local language to their native tongue. Also, language barriers are an impediment to business travelers, tourism, international business prospecting, politics, and cultural learning and understanding between different global communities. An understanding of local language is therefore critical to promoting positive and safe travel experiences, especially when those experiences might escalate into crisis situations.

What are needed, therefore, are improved computer-implemented techniques and tools that can more effectively determine available human language translation resources and communicate that information to various users. Such techniques and tools are especially important for travelers who do not understand the local language of a given country or travel destination.

BRIEF DESCRIPTION OF THE FIGURES

FIG. 4 illustrates another example of a user interface screen for a language identification and communication system structured in accordance with certain embodiments of the invention.

FIG. 5 illustrates an example of a user interface screen associated with a language learning module of a language identification and communication system structured in accordance with certain embodiments of the invention.

FIG. 6 illustrates another example of a user interface screen associated with a language learning module of a language identification and communication system structured in accordance with certain embodiments of the invention.

DETAILED DESCRIPTION

In developing various embodiments of the invention described herein, the inventors have created a technology-based human language translation platform and associated services. The platform offers innovative tools, techniques, and processes to geolocate a user or group of users with a choice of different available and locally-sourced human language translators. The platform improves on the timeliness and urgency of identifying translators and connecting available translators to the user. The platform enables individuals or groups of users to use voice call or video conferencing capabilities. In one embodiment, the technology is American sign language compatible. In various embodiments, the platform represents an improvement over prior systems, because it can identify where both the user and the potential translators are located and then communicate timely assistance. Other services lack a similar responsiveness approach and often require a pre-scheduled appointment.

Translators identified by the platform can be locally sourced to provide firsthand knowledge of local language and culture. The inventors have discovered that live human translators are often more accurate than artificially intelligent (AI) algorithms and are capable of grasping and communicating linguistic nuances where AI often cannot. The platform realizes an improvement in addition to or in place of artificial intelligence, in that the platform can provide nuanced language translation meanings by leveraging human translators.

An audio/video functionality of the platform can accommodate large tour group translations, for example, and can provide a valuable service to the hearing impaired. By leveraging the power of crowdsourcing in conjunction with the technology of geolocation, the platform can be used to connect users to locally sourced translators. This facilitates better human relationships and communication by breaking down language barriers for travelers and natives alike in different parts of the world. As a product, the platform offers innovative processes and methods to instantly geolocate the user and pair the user or group of users with a local translator. These processes and methods improve on the timeliness and urgency of connecting a user to a translator.

Figure 1:
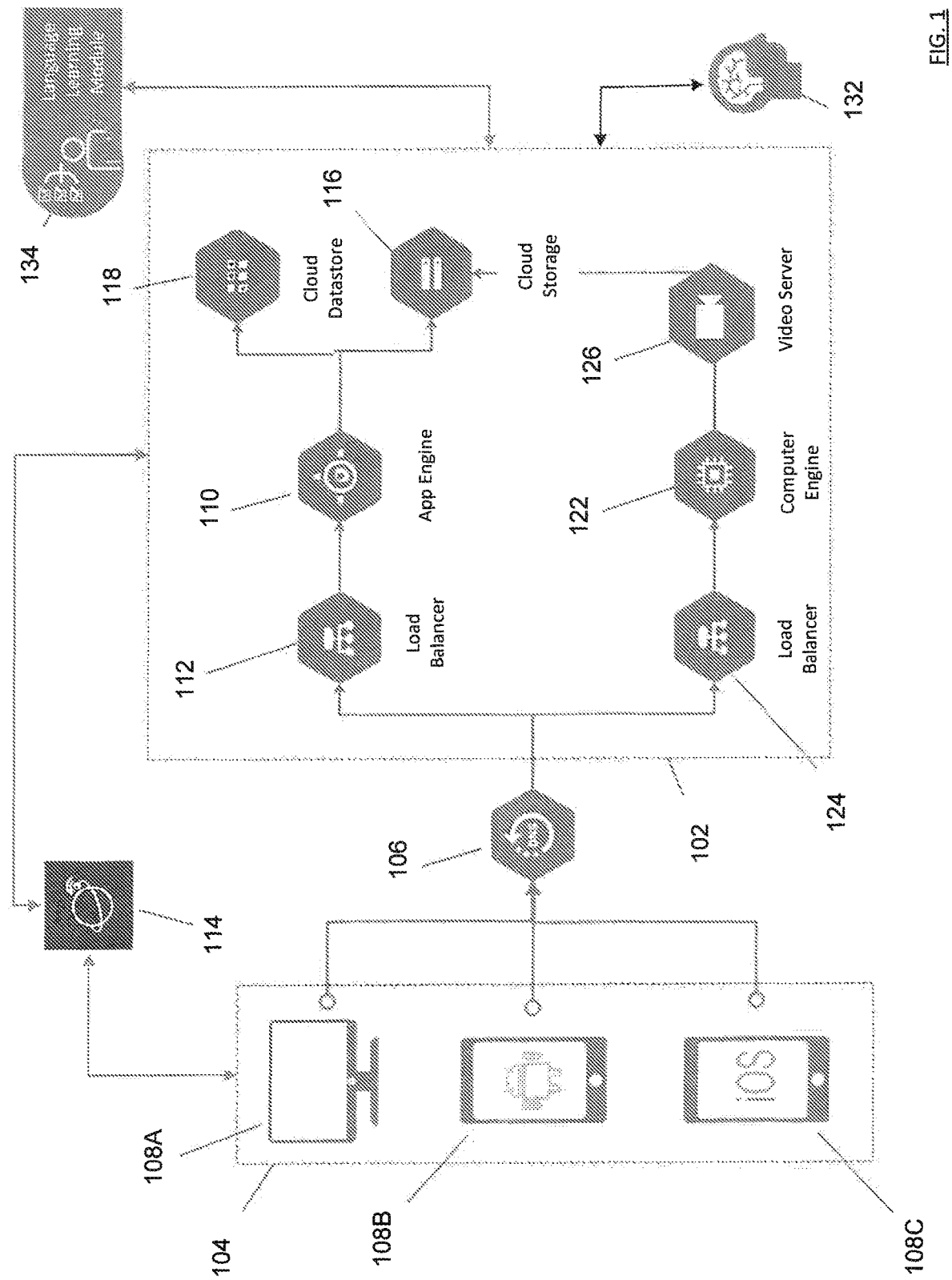
FIG. 1 illustrates different aspects of one example of a computer architecture and process flow associated with a language identification and communication system structured in accordance with certain embodiments of the invention.

FIG. 1 illustrates different aspects of one example of a computer architecture and process flow associated with a language identification and communication system 102 structured in accordance with certain embodiments of the invention. In operation, various kinds of individual users or groups of users 104 can access and communicate with the system 102 via an Internet connection 106 or other network medium connection. Users 104 may employ a variety of access devices 108A, 108B, 108C, such as mobile phones, smart phones, laptops, electronic tablets, or other devices capable of communication with the system 102. The user 104 population may be a combination of users requesting translation services and human translators offering their services.

The system 102 may include an application engine 110 operatively associated with a load balancer 112 (e.g., "Google" load balancer) which is configured for processing communications between the system 102 and devices 108 through the connection 106. The application engine 110 may be operatively connected for communication with a geolocation module 114. In this manner, the application engine 110 is able to readily locate a position of the user 104 (or group of users 104) requesting translation services, as well as a position of one or more local translator type users 104 who can assist in resolving a language related issue or situation. Likewise, devices 108 may be programmed with suitable components or modules which can communicate effectively with the geolocation module 114 to notify the system 102 of the various locations of the devices 108. The application engine 110 may be operatively associated with a cloud storage module 116 which can facilitate storing, retrieving, and communicating various kinds of data processed by the system 102 with one or more cloud storage media 118.

In various embodiments, a video processing engine 122 may be operatively associated with a load balancer 124 (e.g., "Google" load balancer) which is configured for processing video content communications between the system 102 and the devices 108 through the connection 106. A video server 126 can be configured to process and communicate video content between the video processing engine 122 and the cloud storage module 116. In various embodiments, video calls between or among different users 104, such as between a group of users 104 seeking translation services and a translator user 104 who has been identified and selected for the group.

Figure 2:
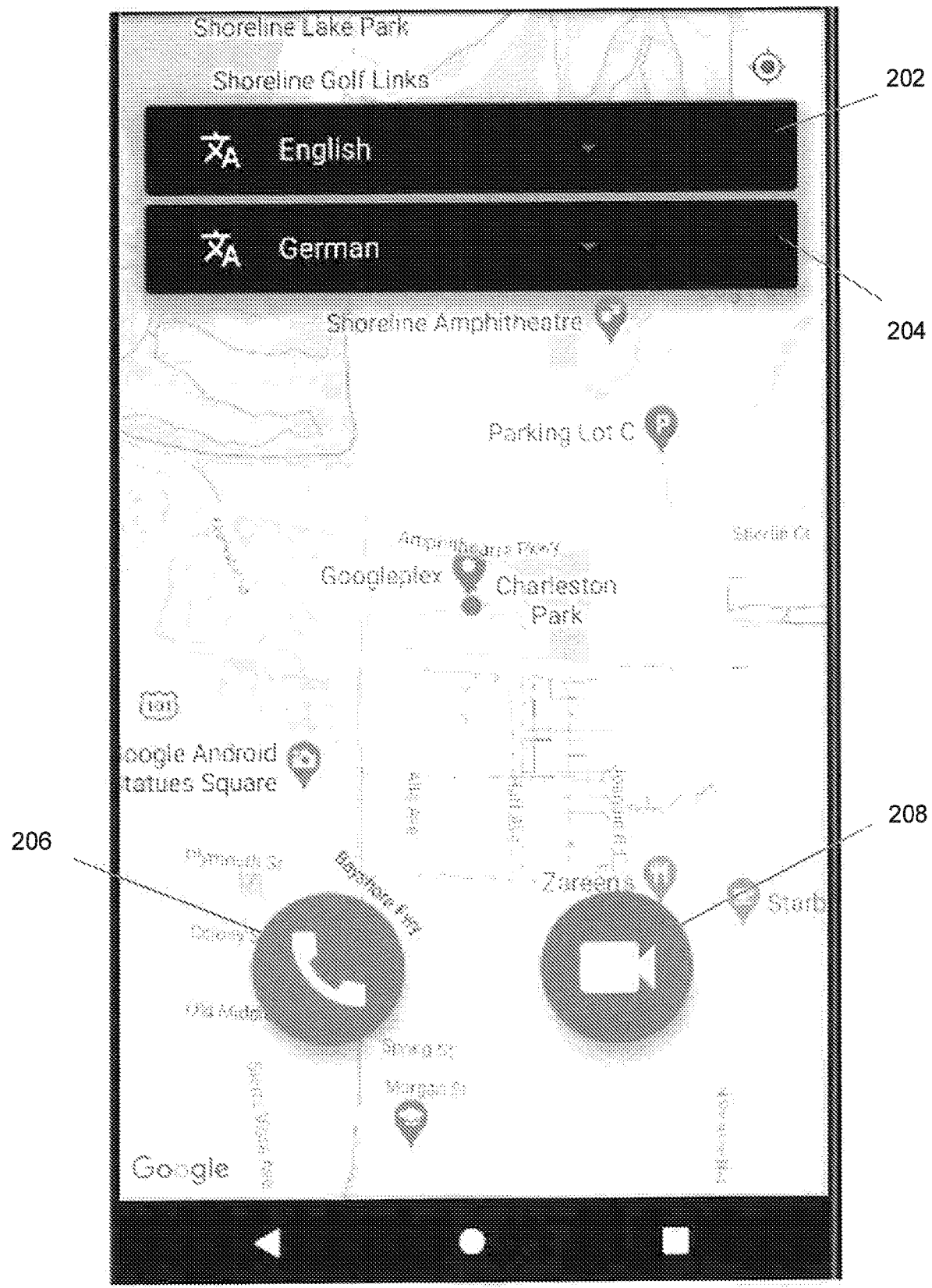
FIG. 2 illustrates one example of a user interface screen for a language identification and communication system structured in accordance with certain embodiments of the invention.
Figure 3:
FIG. 3 illustrates another example of a user interface screen for a language identification and communication system structured in accordance with certain embodiments of the invention.

With reference to FIGS. 2 through 4, examples are provided of user interface screens for use in connection with the language identification and communication system 102 in accordance with certain embodiments of the invention. In various examples, the user 104 may be prompted to: (a) log into an existing account as a member or create a new account (e.g., biographical information, native or source language, payment information) that authenticates with a user identification unique to this platform, (b) authenticate using Facebook/Google credentials, or (c) enter an access code to join a translation in progress as part of a group. The application engine 110 can generate a unique access code for optional use to connect or "join" a second party or group to a translation already in progress. Using the access code may be optional, because the user may choose to use the speaker phone mode on the smartphone device.

The user 104 may be permitted to establish a preference on whether or not to allow location services to be turned on for the purpose of automatically being connected to a local translator through geolocation, or the user 104 can elect to manually enter a target language from a pull down list of all currently available languages (e.g., selections 202, 204 in FIG. 2). Once the language preference has been received from the user, the application engine 110 can establish a VoIP (Voice Over Internet Protocol) phone call (e.g., either via audio with selection 206, or via video with selection 208) with one or more translator users 104. Depending on the translator availability and other factors, the application engine 110 can either simultaneously call multiple translators or perform call hunting, which is calling translators one after the other, sequentially until the call is answered by a translator. Translator locations 302, 304 (e.g., for translators "T1" and "T2") can be displayed on the user interface screen, as shown in FIG. 3. In various embodiments, a privacy shield function can be employed to protect the identity of the translator user 104, until a translation session has been confirmed with another user 104 seeking the services of the translator user 104.

Once the VoIP call is established, the translation session can begin between or among the users 104. The translators profile may be displayed to the user seeking translation services, and the profile may include an image or photo, a country flag to indicate location of the translator, number of years fluent in each language, and/or any special skills of the translator (e.g., occupational, sign language fluent, etc.), among other translator attributes. When trying to establish a VoIP call with a translator, the translator may choose to accept the call, decline the call, or perform no action in which case the call will be disconnected and the translator will be removed from the call routing process.

In various embodiments, the system 102 may be operatively associated with one or more different types of AI or machine learning (ML) modules 132 to enhance the user 104 experience by matching users 104 seeking translation services and translator users 104 based on a variety of data. Examples of such data may include, without limitation, translator ratings, number of phone calls, reviews, number of minutes used, billing history, user location, translator location, availability, and/or network quality, among others.

With reference to FIG. 4, at the conclusion of the translation, the user 104 receiving translation services can be billed based on usage, and the translator user 104 account can display a balance of their earnings. All users 104 can rate their experience using predetermined metrics, including but not limited to: call quality, ease of understanding, professionalism, accuracy, pronunciation, and/or submit a detailed text review, among other kinds of feedback related to the translation experience. The system 102 may employ algorithms which pair different types of users 104 in response to prior scorings or ratings to increase user 104 satisfaction with the platform.

FIGS. 5 and 6 illustrate example of a user interface screen associated with a language learning module of a language identification and communication system structured in accordance with certain embodiments of the invention. The learning module 134 may be configured to present audio and/or video data to various users 104 seeking to learn a foreign language. In this example, the teaching methodology is based upon an interactive conversational exchange centered around situational pictographs that may be adapted to any language. The pictographs represent everyday situations and scenes which do not require knowledge of a certain written or spoken language to comprehend. In certain embodiments, a translator user 104 can be connected with a language-learning user 104. In this scenario, the language-learning user 104 can receive audio instruction from the translator user 104 while reviewing pictograph images on a screen display of a device 108, for example.

In developing the invention, the inventors have recognized that people—wherever they live—share the same core belief that we should strive to make the world a better place in which to live. The invention recognizes that bettering the world starts with understanding each other, learning diverse cultures, embracing our differences, and celebrating what advances us to achieve new heights as a civilization. Embodiments of the invention embrace using technology for good to connect people to break down language barriers wherever they may exist. The language identification and communication system provides a travel companion which can help users to communicate their way through any situation requiring human language translation. When language is no longer an obstacle or a hindrance, users are able to confidently approach and meet new people, form new business relationships, exploit new commercial opportunities, and learn about new cultures and customs.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of system architectures, user interface layouts, process flows, or screen displays described herein can be necessarily intended to limit the scope of the invention.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "collected" and/or "coupled" to indicate that two or more elements can be in direct physical or electrical contact with each other. The term "coupled," however, also may mean that two or more elements can be not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc. Such technologies can be generally well known by those of ordinary skill in the art and, consequently, can be not described in detail herein.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as claimed herein.

What is claimed is:

1. A computer-implemented language identification and communication system comprising:
   an application engine configured for processing data associated with multiple access devices of a population of users comprising users seeking human language translation services and users providing human language translation services;
   a network connection configured for establishing data communication between the application engine and the multiple access devices;
   a geolocation module operatively associated with the application engine, the geolocation module programmed for locating a position of at least one user seeking human language translation services and at least one user providing human language translation a services, wherein an access device is programmed for communication with the geolocation module; and
   the application engine further programmed for:
      receiving a translator selection from an access device of a user seeking translation services, and
      establishing a communication connection between an access device of the selected translator and the access device of the user seeking translation services.

2. The system of claim 1, wherein the user seeking translation services comprises a group of users seeking translation services.

3. The system of claim 1, further comprising in combination a video processing engine coupled with a video server, wherein the combination is programmed to process and communicate video content associated with communications between at least one user seeking human language translation services and at least one user providing human language translation services.

4. The system of claim 1, further comprising a load balancer configured for processing a user data communicated between the application engine and the multiple access devices through the network connection.

5. The system of claim 1, further comprising the application engine programmed for allowing the users to establish a preference on whether or not to allow the application engine to automatically connect to an access device of a local translator through functioning of the geolocation module.

6. The system of claim 1, further comprising the application engine programmed for allowing the users to manually enter a target language from a list of all currently available languages.

7. The system of claim 1, further comprising the application engine programmed for establishing a communication connection between an access device of the selected translator and the access device of the user seeking translation services by establishing a VoIP connection between the multiple access devices.

8. The system of claim 1, further comprising the application engine programmed for simultaneously contacting multiple translators in response to determining translator availability.

9. The system of claim 1, further comprising the application engine programmed for contacting multiple translators sequentially in response to determining translator availability.

10. The system of claim 1, further comprising the application engine programmed for displaying at least one determined translator location on a user interface screen of the user access device.

11. The system of claim 1, further comprising the application engine programmed for employing a privacy shield function can be employed to protect an identity of at least one translator user until a translation session has been confirmed with another user seeking translation services.

12. The system of claim 1, further comprising the application engine programmed for displaying at least one translator profile on a user interface screen of the user access device.

13. The system of claim 12, further comprising the application engine programmed for displaying at least one translator profile comprising an image of the translator, a country flag A to indicate geolocation of the translator, language fluency of the translator, a special skill of a translator, or a combination thereof.

14. The system of claim 1, further comprising at least one machine learning module operatively associated with the application engine, at least one machine learning module programmed for matching users seeking translation services and translator users.

15. The system of claim 14, further comprising the at least one machine learning module programmed for matching users in response to translator ratings, number of phone calls, reviews, number of minutes used, billing history, user location, translator location, availability, network quality, or a combination thereof.

16. The system of claim 1, further comprising a language learning module operatively associated with the application engine.

17. The system of claim 16, further comprising the language learning module programmed for displaying at least one pictograph on a user access device.

18. The system of claim 1, wherein at least one of the user multiple access devices comprises a mobile phone.

* * * * *